June 2, 1970     J. E. SANSOM     3,515,601
SPRAY CLOSET QUENCH
Filed May 15, 1967     3 Sheets-Sheet 1
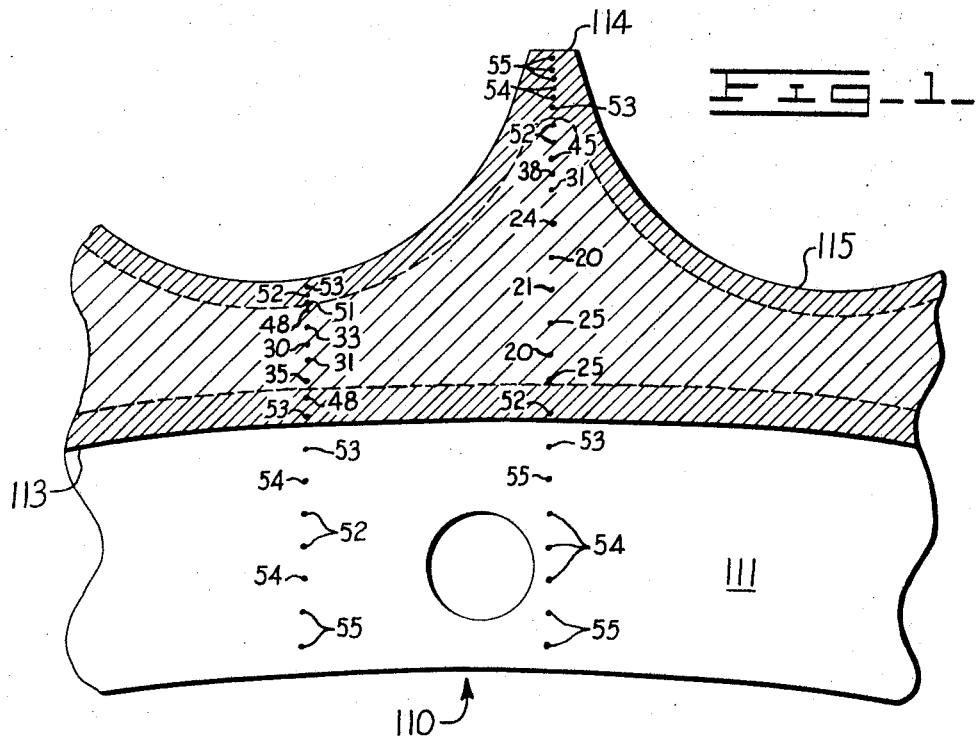
Fig-1-
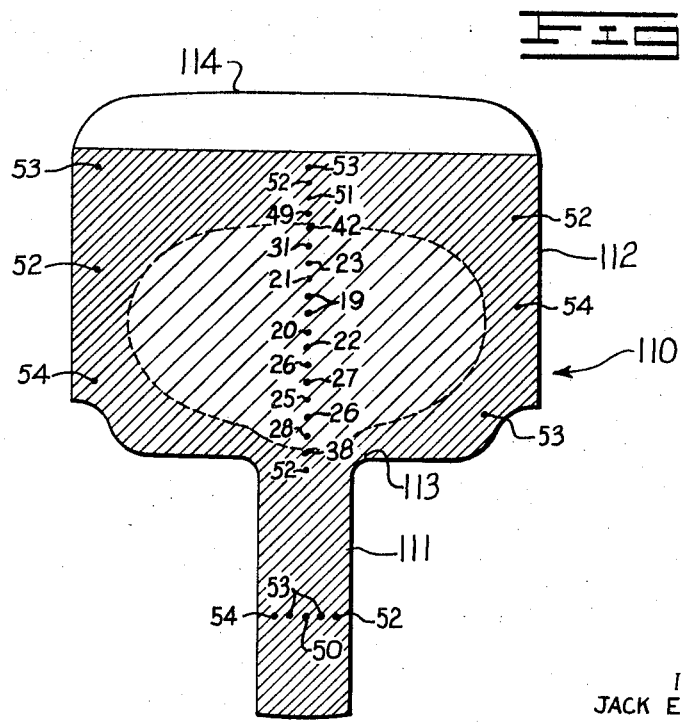
Fig-2-
INVENTOR.
JACK E. SANSOM
BY
Fryer, Tjensvold, Feix, Phillips & Lempio
ATTORNEYS

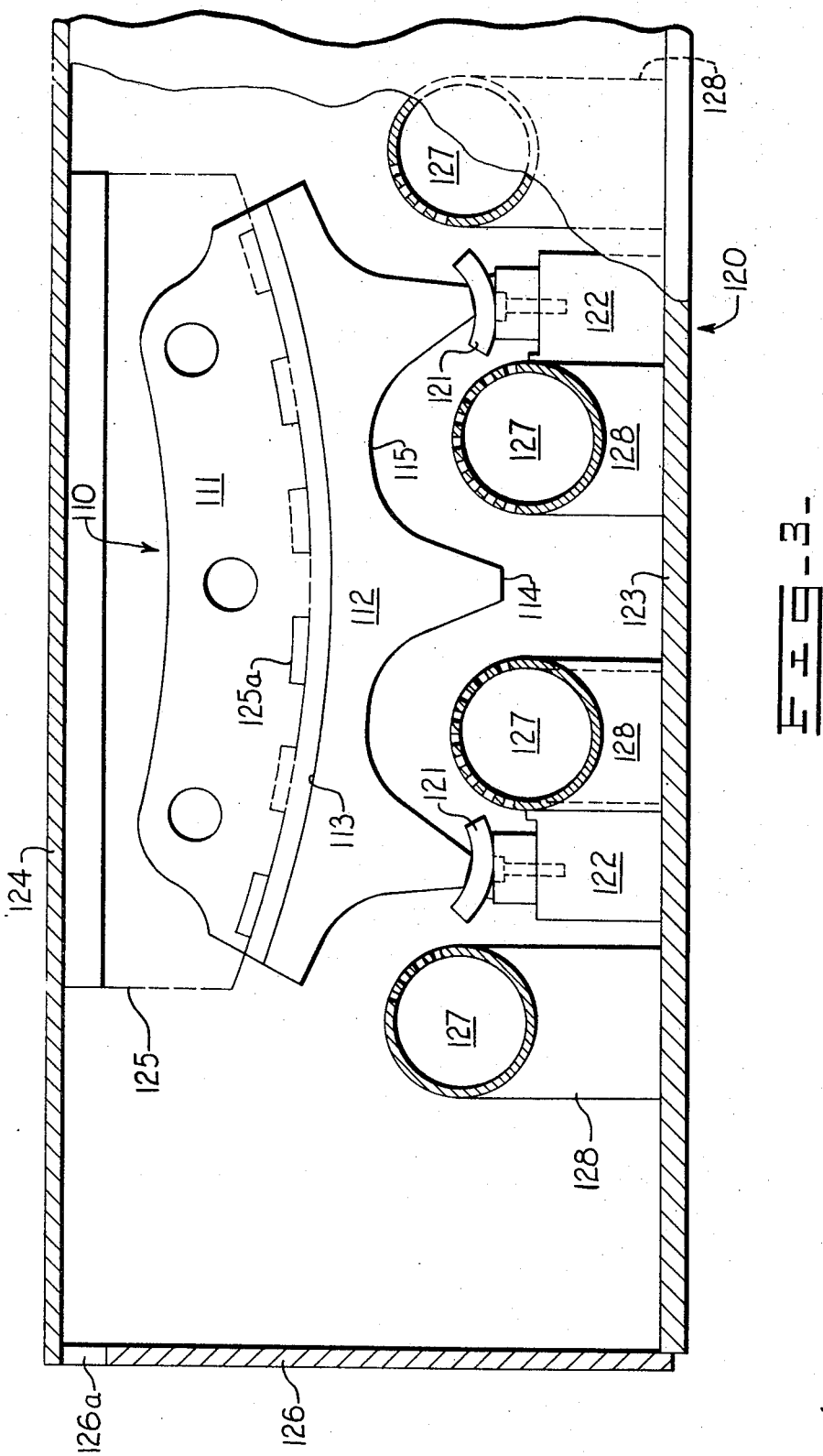

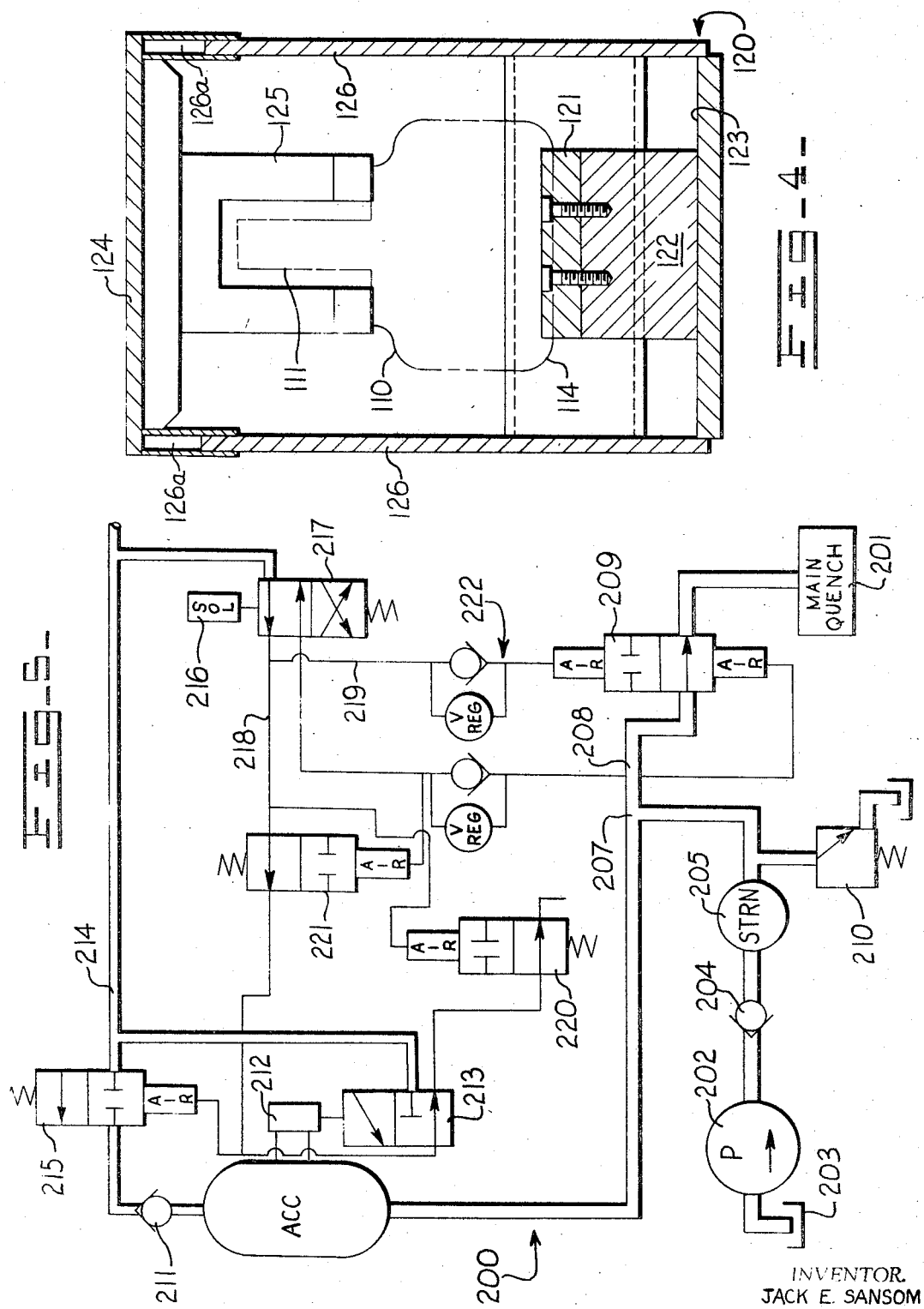

United States Patent Office 3,515,601
Patented June 2, 1970

3,515,601
SPRAY CLOSET QUENCH
Jack E. Sansom, Eureka, Ill., assignor to Caterpillar Tractor Co., Peoria, Ill., a corporation of California
Filed May 15, 1967, Ser. No. 638,359
Int. Cl. C21d 1/64
U.S. Cl. 148—147                            3 Claims

ABSTRACT OF THE DISCLOSURE

Irregularly-shaped wear-pieces are quenched to obtain uniform case hardness at their surfaces without distortion, cracking, etc. by heating them to their critical temperature ranges, positioning them in any empty spray closet, subsequently impinging metered sprays of quenching fluid on portions of such wear-pieces having the heavier section, and thereafter continuing said directed sprays to flood the spray closet and establish currents of quenching fluid directed at such portions to uniformly drop the temperature of the surfaces of the wear-pieces at a critical rate to establish uniform hardness of such surfaces. Once uniform hardness is obtained in such wear-pieces they may subsequently be tempered, if desired, in a conventional manner.

BACKGROUND OF THE INVENTION

Replaceable wear-pieces in machinery often have highly irregular surfaces which are subject to high rates of wear. An example of such a replaceable wear-piece is a sprocket segment employed in the drive of track-type vehicles. This segment has thick, wide teeth for engagement of and support of the track links and in turn is supported on a thin, radially-extending web or flange which is bolted to the hub of the vehicle. A plurality of these segments are bolted circumferentially about the hub to form a circular drive sprocket and can be collectively or independently replaced when worn or broken.

The surfaces of such sprocket segments are employed in abrasive soil environments where the tracks are operated and, unless they are hardened to increase their service life, very frequent replacement is necessary. While hardening offers increased service life, the varying cross-sectional area and irregular shape of these segments present a difficult problem in hardening. Also, since hardening increases strength it is desirable to harden the web or flange, especially where it is joined to the tooth structure, as well as the direct rub surfaces on the faces of the teeth which engage the track links. Also the flange or web must be capable of taking heavy loads in the area where the bolts pass therethrough to mount it on the hub which requires strengthened structures.

Therefore, conventional hardening techniques of such an irregular wear-piece, such as a sprocket segment, have not been satisfactory. Not only is it difficult to drop the temperature of all the surfaces of a critical rate for hardening, but in the case of machined wear-pieces, only limited distortion is allowable and hardening must be accomplished within such limits. For example, in the case of sprocket segments less than 0.015 inch distortion during the hardening process is allowable. The instant spray quench technique is designed to provide a case of uniform hardness of the surfaces of irregular wear-pieces without detrimental distortion or creation of high internal stresses which will develop cracks in the wear-piece, weakening it. These and other objectives can be obtained through the use of spray quench techniques.

SUMMARY OF INVENTION

Uniform hardness is obtained at the surfaces of irregularly-shaped wear-pieces by heating them to their critical temperature ranges, positioning them in an empty spray quench closet, subsequently directing metered high-pressure sprays of quenching liquid at portions of the wear-pieces having the heavier sections, said sprays being metered so that the volume of quenching liquid initially impinging on such portions is proportional to the section size, and continuing said sprays to immerse such wear-pieces in the quenching liquid and establish currents of quenching liquid at such portions whereby the surfaces are cooled at a critical rate for achieving uniform hardness.

BRIEF DESCRIPTION OF DRAWINGS

FIG. 1 is a vertical section of a portion of the sprocket segment and FIG. 2 is a cross-section of the same segment with both drawings having relative Rockwell Hardness indications represented thereon;

FIG. 3 is an elevation, partly in section, of a spray closet for quenching showing a sprocket segment positioned therein for treatment;

FIG. 4 is a cross-section of the spray closet from an end elevation; and

FIG. 5 is a schematic of the fluid circuits employed with the spray closet for accomplishing the quenching cycle.

DESCRIPTION OF AN EMBODIMENT

Quenching is the process of hardening metal alloys, particularly those of steel and carbon, by rapid cooling effected through contacting the metal alloy with liquids. To achieve hardness by quenching it is necessary that the alloys be raised to their critical temperature range and then cooled at a critical rate so that particular crystalline structures will be formed. In steels the percentage of carbon affects the quenching process measurably in certain ranges, as is well known in the art.

Considerable difficulty arises in quenching irregularly-shaped wear-pieces since heat flows from the exterior to the interior of steel or vice versa at a definite rate so that both heating and cooling during the quench must take this into account. Regarding heating, the wear-piece to be treated can be annealed to insure that the heat flow inside the piece will reach the critical temperature ranges as well as those near the surfaces. However, quenching presents a more difficult problem since cooling at the surfaces must be accomplished at a critical rate or greater in order to achieve increased hardness. Thus, the higher quantity of heat stored in the heavier section will generally prevent the surfaces in the areas of the heavier sections from being cooled at a critical rate.

In the sprocket segment described above, quenching employing conventional techniques resulted in cracking either around the bolt holes or the radius where the flange or web is joined to the tooth structure and often resulted in varying degrees of hardness across the rub faces of the teeth, allowing some portions to wear faster than others. Thus, the objectives in developing a spray closet quench technique for sprocket segments were to maximize uniform hardness to a reasonable depth while maintaining distortion at a minimum and avoiding cracks in the sprocket structure due to high stress patterns. The technique and apparatus described herein fulfills these objectives.

Referring to FIGS. 1 and 2, the varying irregular cross-sectional character of the sprocket segment 110 can be seen. The cross-sectional area varies appreciably where the mounting web or flange 111 joins the thick tooth structure 112 in the area of radius 113. Further, the cross-sectional area changes transversely of the tooth section because of the height variation between the crown 114 and the root 115 of each tooth.

Hardening sprocket segments according to conventional techniques often results in hardened crowns, soft roots in the tooth structure, and cracks about the web or flange in the area of bolt holes and radius where it joins the tooth structure. However, by use of spray closet quenching techniques it is possible to obtain relatively uniform hardness at the surfaces of the segment across the full surfaces of the teeth and also in the area of the bolt holes and the radius where the web joins the tooth structure. On FIGS. 1 and 2 relative Rockwell Hardness indications are delineated and it can be seen that the surfaces of the segments have a mean relative hardness from 52 to 53 without substantial variation. With this uniform hardness over the entire surface of the structure the principal objective of long service life in the segment is achieved.

In carrying out the process, a box-like fixture is used in which the wear-piece to be treated is accurately positioned. In the instant description reference will be made to the sprocket segments, described above, as illustrative of typical wear-pieces that can be treated, and while the technique is related to treatment of a single structure, it should be appreciated that multiple wear-pieces can be treated simultaneously.

In FIGS. 3 and 4, segment 110 is shown positioned in spray closet 120 on spaced positioning saddles 121 supporting the segment through the crowns 114 of its outboard teeth. These saddles are supported by posts 122 attached to the floor of the closet. Of course, before positioning the segment it is heated in a furnace to its critical temperature range (determined by its composition) and then placed in the saddles with manual or automatic tongs (not shown). These saddles will insure that the segment is always accurately positioned in the closet so that the sprays discused later will always impinge upon the selected portions of the sprocket.

Once the sprocket is positioned in the closet, a lid 124 is placed on the closet which has attached thereto a bifurcated shield 125 which receives the upward extending web or flange 111 of the segment. A clearance is provided between the sides of the shield and the web or flange with the inboard edge 125a of the shield being notched for increased circulation of the quenching fluid.

Generally, the inside volume of the empty closet is several times the volume of the segment and the walls 126 of the closet have openings 126a near the top so that the quenching liquid can overflow the closet as the latter fills due to the introduction of quenching liquid. A drain (not shown) is located on the floor of the closet to drain once the quenching cycle has been completed so that another heated segment can be placed into the empty spray closet.

Located near the floor of the closet are a plurality of spray tubes 127 supported from the floor on web structures 128 and also by the lower wall sections of the closet. Each of these tubes has a plurality of perforations 127a in their upper surfaces positioned so that quenching liquid will be sprayed at predetermined portions of the segment held in the saddles. The size of the perforations can be varied in order to meter the volume of spray at selected locations of the segment. Of course, various nozzles, etc. can be used instead of the spray tube perforations which can be adjusted to give the desired direction and volume of flow of quenching liquid. Basically, the perforations or equivalent structures are designed to meter quenching liquid and direct the same towards the portion of the segment having the heavier section (i.e., greater cross-sectional area).

The novel technique of this invention involves placing the heated segment to be quenched in the empty closet and then initially impinging a high volume flow of quenching liquid on the portions contiguous to the heavier sections of the segments, followed by immediate total immersion of the segments within the liquid and continuing high volume flow (currents) towards the heavier section areas after the segment becomes immersed so that the rate of cooling in these areas can be maintained at a critical rate. Those skilled in the art can appreciate the manner and metering techniques used in this quenching procedure and it need not be explored at length.

This technique is designed to insure that all portions of the surfaces of the irregularly-shaped segments are cooled at a rate equal or greater than a critical rate. Naturally, the size and shape of the wear-pieces to be quenched will dictate such things as areas of initial impingement, volume of the closet, flow shielding required, and types of quenching liquid to be employed. However, these factors are well within the comprehension of those skilled in the art when applying the basic concept disclosed herein.

In order to effect quenching, large volumes of quenching liquid at high pressures are required. In FIG. 5 a schematic illustration of plumbing circuits 200 is shown as a typical means for providing high volume, high pressure quenching medium to the spray tubes so that the method of the invention can be accomplished.

The spray tubes are connected to a common manifold 201 and pump 202 fed from the quench tank 203 feeds a water) through check valve 204, strainer 205 to accumulator 206 via line 207 for charging the quench system. During charging of the accumulator, line 208 which connects line 207 with the manifold is closed by a pneumatically-operated valve 209. The maximum charging pressure is controlled by the setting of relief valve 210 and normally water is pumped into the accumulator against a trapped volume of air held by check valve 211 until the proper volume of quenching medium is in the accumulator system.

During the charging cycle, a water level sensing unit 212 will direct air pressure from pneumatic line 214 via valve 213 to close valve 215 until the appropriate water level is reached in the accumulator. At such time valve 213 will cut off the source of air to valve 215 allowing it to open under the influence of its spring pressure. At this time the accumulator is charged with air pressure to that of pneumatic line 214, which is usually slightly below the setting of the relief valve 210. A slight additional amount of water may then be pumped into the accumulator until the relief pressure is reached, at which time the further pumping will merely bypass the system to tank. This somewhat complicated charging procedure insures a uniform pressure and volume for each quenching charge which is important to achieve repeatable results. Other systems accomplishing these functions can likewise be employed.

After the charging cycle is completed and a segment is positioned within the spray closet with the lid in position, a quench can be effected. Normally, a solenoid 216 is used to connect pneumatic valve 217 to the pneumatic line, which in turn pressurizes lines 218 and 219 with air pressure from line 214.

Pressure in line 218 closes valve 220 so that pressure reflected through valve 221 can close valve 215 connecting the accumulator to penumatic pressure line 214 so that during release of the charge air pressure is not fed into the accumulator.

Subsequent to the closing of valve 215 due to regulation of the air pressure from line 219 through regulator valve 222, the charge in the accumulator will be released to the manifold by actuation of the latter valve and thus to the spray tubes in the spray close.

In quenching the irregularly-shaped sprocket segment depicted in the drawings, the sprays are oriented so that large volumes of quenching liquid impinge in the root areas of the teeth, particularly where the surfaces rise toward the crowns. Metering is generally proportional to the immediate cross-section area below the area of impingement. In the instant application, the manifold passes about 3,000 gallons per minute to the spray closet in the initial two-tenths of a second; thereafter the flow reduces to 2,400 gallons per minute in a second, subsequently falling to 2,000 gallons per minute within three seconds, and then dropping substantially in the next twenty seconds.

Normally when treating a single segment the volume of the closet will be in the neighborhood of 2 or 3 gallons, and it can be appreciated that these high flow rates will quickly flood the closet and place the segment in an immersed condition with strong flow patterns directed toward the heavier sections of the segment. Further, the rapid circulation of the fluid up, across and out of the spray closet will insure that fairly uniform quenching liquid temperatures are maintained since the liquid warmed by quenching action will be expelled from the top of the closet. The shielding around the web structure prevents it from cooling too rapidly due to its thin cross-sectional area and the large flow of quenching medium therepast.

In actual operation, the spray closet quench technique has proved very successful as is evidenced by the actual hardness indication in FIGS. 1 and 2 showing that hardness is uniform. Further, while the spray closet technique has been described with reference to sprocket segments, it should be appreciated that it can be applied to many irregularly-shaped wear-pieces.

What is claimed is:

1. A method of hardening irregularly-shaped wear-pieces to obtain uniform hardness at their surfaces without causing high internal stress while employing quenching comprising:
   (a) heating such wear-pieces to their critical temperatures for quenching;
   (b) positioning the resulting heated wear-pieces in an empty spray closet of a limited volume in a predetermined position;
   (c) subsequently directing metered flows quenching fluid in high volume to impinge on portions of said heated wear-pieces which have the heavier sections; and
   (d) continuing said metered flows of quenching fluid for a sufficient period in excess of that necessary to flood said closet, said metered flows being controlled to cool all surface portions of said wear-pieces at a critical rate through the initial impingement, subsequent flood and fluid circulation patterns established in said flooded closet whereby uniform case hardness of said wear-piece is obtained.

2. A method as defined in claim 1 wherein the quenching liquid directed at the portions of the wear-pieces with the heavier sections is metered in an amount proportionate to the relative section size of that portion to obtain uniform hardness.

3. The method as defined in claim 1 wherein the wear-piece is a sprocket segment.

References Cited

UNITED STATES PATENTS

| | | | |
|---|---|---|---|
| 1,391,907 | 9/1921 | Schaffer | 148—146 X |
| 2,178,281 | 10/1939 | Judge | 148—146 |
| 3,305,409 | 2/1967 | Cary | 148—146 |
| 3,407,099 | 10/1968 | Schell | 148—143 X |

J. SPENCER OVERHOLSER, Primary Examiner

J. S. BROWN, Assistant Examiner

U.S. Cl. X.R.

134—44; 266—6